US012782664B2

(12) United States Patent
Oguro

(10) Patent No.: US 12,782,664 B2
(45) Date of Patent: Nov. 3, 2026

(54) OPTICAL MODULE

(71) Applicant: NEC Corporation, Tokyo (JP)

(72) Inventor: Mamoru Oguro, Tokyo (JP)

(73) Assignee: NEC CORPORATION, Tokyo (JP)

( * ) Notice: Subject to any disclaimer, the term of this patent is extended or adjusted under 35 U.S.C. 154(b) by 294 days.

(21) Appl. No.: 18/687,956

(22) PCT Filed: Sep. 9, 2021

(86) PCT No.: PCT/JP2021/033102
§ 371 (c)(1),
(2) Date: Feb. 29, 2024

(87) PCT Pub. No.: WO2023/037464
PCT Pub. Date: Mar. 16, 2023

(65) Prior Publication Data
US 2024/0353648 A1 Oct. 24, 2024

(51) Int. Cl.
*G02B 7/00* (2021.01)
*G02B 7/22* (2021.01)

(52) U.S. Cl.
CPC ............... *G02B 7/005* (2013.01); *G02B 7/22* (2013.01); *G02B 7/006* (2013.01)

(58) Field of Classification Search
None
See application file for complete search history.

(56) References Cited

U.S. PATENT DOCUMENTS

2011/0013063 A1* 1/2011 Yamamoto ............. H04N 23/55 359/811
2011/0026148 A1* 2/2011 Tanimura ............. G02B 13/001 359/823
2021/0014416 A1* 1/2021 Kim ..................... G02B 27/644
2023/0152668 A1* 5/2023 Liu .......................... H02N 2/22 310/323.17

FOREIGN PATENT DOCUMENTS

JP 2004-246181 A 9/2004
JP 2004-320855 A 11/2004
JP 2013-044862 A 3/2013

OTHER PUBLICATIONS

International Search Report for PCT Application No. PCT/JP2021/033102, mailed on Nov. 30, 2021.
English translation of Written opinion for PCT Application No. PCT/JP2021/033102, mailed on Nov. 30, 2021.

* cited by examiner

*Primary Examiner* — Robert E. Tallman
(74) *Attorney, Agent, or Firm* — Sughrue Mion, P.LLC

(57) ABSTRACT

The optical module includes a casing for housing an optical component, a first cushioning material provided between the optical component and a first surface on the inside of the casing, and a piezoelectric element which is provided between the first cushioning material and the first surface and is capable of expanding and contracting in the direction from the first surface to the optical component.

14 Claims, 7 Drawing Sheets

OPTICAL MODULE

This application is a National Stage Entry of PCT/JP2021/033102 filed on Sep. 9, 2021, the contents of all of which are incorporated herein by reference, in their entirety.

TECHNICAL FIELD

The present invention relates to an optical module in which a load to be applied to an internal optical component is easily adjustable.

BACKGROUND ART

In an optical submarine cable system, optical communication between land terminals is performed through a submarine cable to which an optical module such as a repeater is attached. At that time, the optical module is subjected to various types of vibration and impact in the sea, thus, an optical component in the optical module needs to be fixed in the optical module in order to prevent the optical component from being affected by vibration and impact. For example, PTL 1 discloses an example of a repeater to be used for an optical submarine cable system.

A general optical module has a structure illustrated in FIGS. 6 and 7. As illustrated in FIG. 6, an optical module 1000 includes an optical component 1001, a casing 1002, and cushioning materials 1003A and 1003B. Furthermore, as illustrated in FIG. 7, when a lid 1004 is attached to the casing 1002, the cushioning materials 1003A and 1003B are pressed against the optical component 1001. Thus, the cushioning materials 1003A and 1003B apply a load to the optical component 1001, and therefore the optical component 1001 is fixed in the optical module 1000.

CITATION LIST

Patent Literature

PTL 1: Japanese Unexamined Patent Application Publication No. 2004-320855

SUMMARY OF INVENTION

Technical Problem

However, in the optical module illustrated as an example in FIGS. 6 and 7, a thickness of the cushioning materials and the casing are fixed to one size, thus making it difficult to adjust a load to be applied to the optical component 1001. Meanwhile, for example, when a weak load is applied, there is a risk of shifting a fixed position of the optical component due to vibration and impact in the sea. Furthermore, when a strong load is applied, there is a risk of variation of optical characteristics due to distortion of an optical system in the optical component.

The present invention has been made in view of the above-described problem, and an object of the present invention is to provide an optical module in which a load to be applied to an internal optical component is easily adjustable.

Solution to Problem

An optical module according to the present invention includes: a casing that houses an optical component; a first cushioning material that is provided between the optical component and a first surface on an inner side of the casing; and a piezoelectric element that is provided between the first cushioning material and the first surface and is capable of expanding and contracting in a direction from the first surface to the optical component.

Advantageous Effects of Invention

The present invention enables providing an optical module in which a load to be applied to an internal optical component is easily adjustable.

EXAMPLE EMBODIMENT

First Example Embodiment

Figure 1:
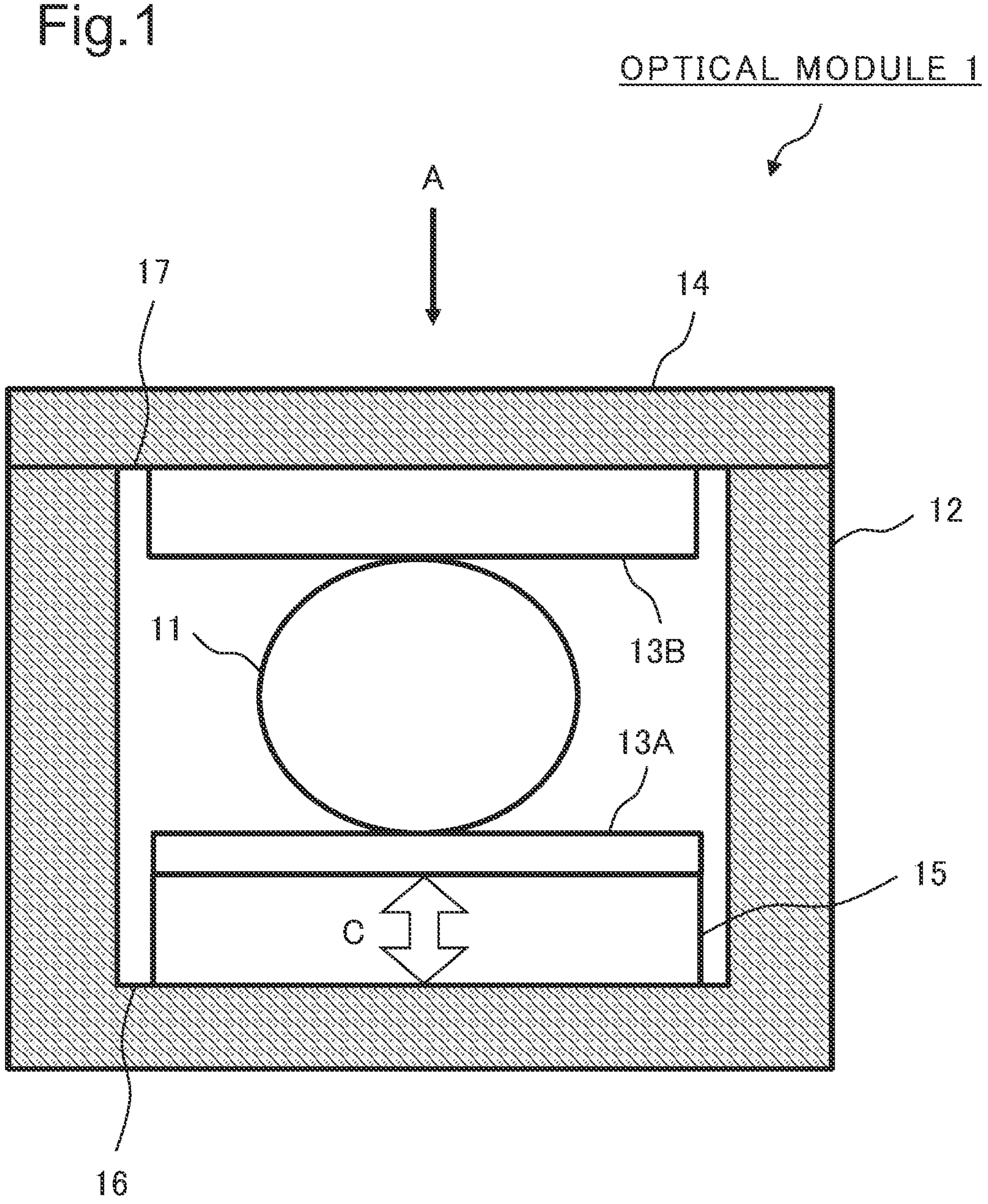
FIG. 1 is a block diagram illustrating a configuration example of an optical module according to a first example embodiment of the present invention.
Figure 2:
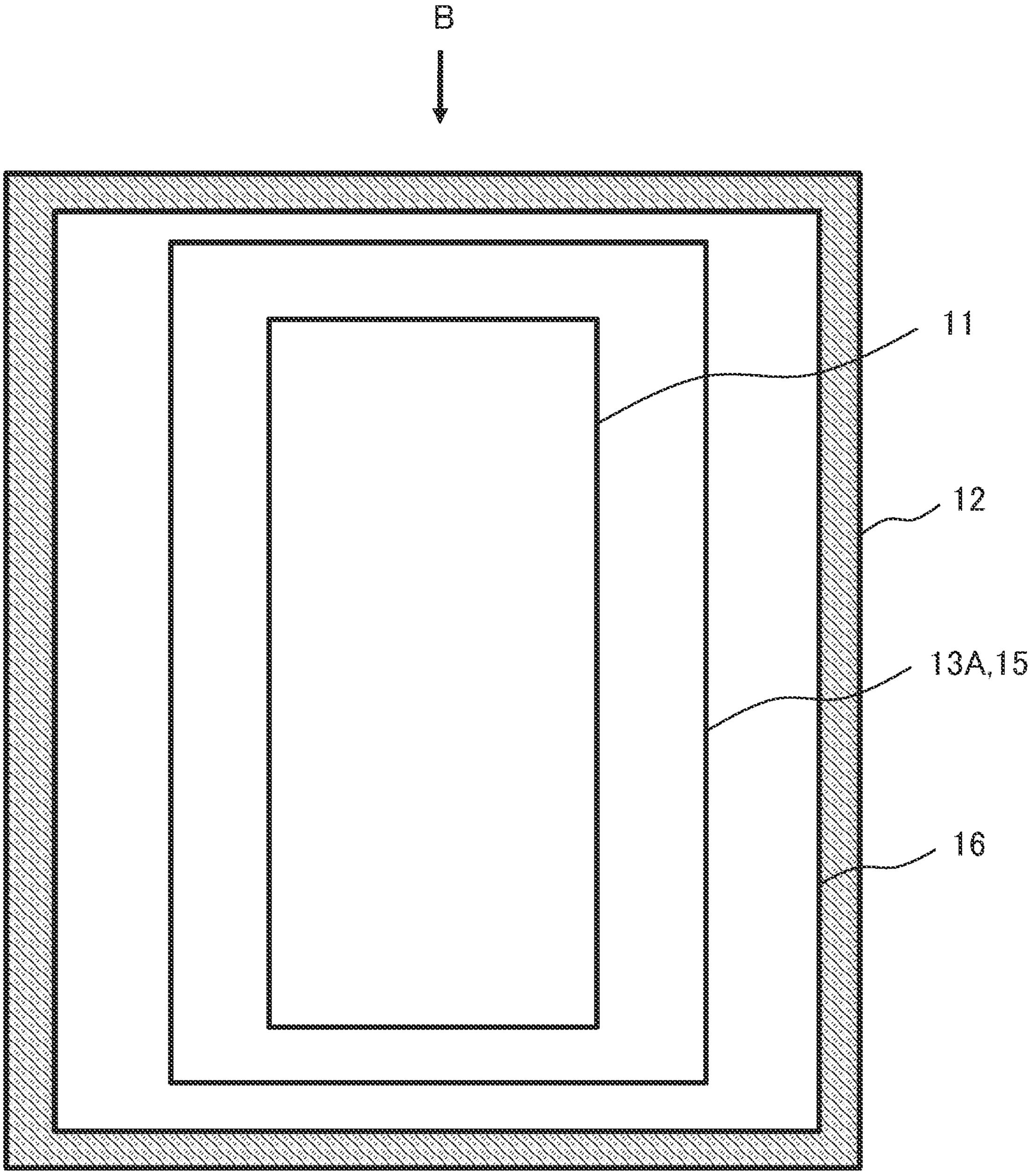
FIG. 2 is a diagram for explaining the optical module according to the first example embodiment of the present invention.

An optical module 1 according to a first example embodiment is explained based on FIGS. 1 and 2. FIGS. 1 and 2 are each a schematic diagram illustrating a configuration example of the optical module 1. Specifically, FIG. 1 is a transparent diagram of the optical module 1 as viewed from a side surface (from a direction of arrow B in FIG. 2). FIG. 2 is a transparent diagram of the optical module 1 excluding a lid 14 and a second cushioning material 13B, which are described below, as viewed from a top surface (from a direction of arrow A in FIG. 1).

As illustrated in FIG. 1, the optical module 1 includes an optical component 11, a substrate portion 12, a first cushioning material 13A, the second cushioning material 13B, the lid 14, and a piezoelectric element 15. The optical module 1 is, for example, a repeater to be attached to a submarine cable, and an optical fiber through which an optical signal processed by the optical component 11 propagates is attached to the optical module 1. FIG. 1 illustrates the optical module 1 in a state where the lid 14 is attached to the substrate portion 12. In the following description, a combination of the lid 14 and the substrate portion 12 in this state is referred to as a casing.

The optical component 11 is, for example, an optical isolator, an optical coupler, or an optical filter. The optical component 11 is provided inside the substrate portion 12. The optical component 11 processes an optical signal from the outside of the optical module 1, and outputs the optical signal to the outside of the optical module 1.

The substrate portion 12 is formed into a container shape with an open top surface. The substrate portion 12 houses the optical component 11, the first cushioning material 13A, the second cushioning material 13B, and the piezoelectric element 15. The lid 14 is attached to the substrate portion 12, the optical component 11, the first cushioning material 13A, the second cushioning material 13B, whereby the piezoelectric element 15 are sealed in the casing. In other words, the casing seals the optical component 11, the first cushioning material 13A, the second cushioning material 13B, and the piezoelectric element 15. The lid 14 is attached to the substrate portion 12, for example, with screws or the like.

The first cushioning material 13A and the second cushioning material 13B are provided between the casing and the optical component 11. Specifically, the first cushioning material 13A is provided between the optical component 11 and a first surface 16 on an inner side of the casing. The second cushioning material 13B is provided between the optical component 11 and a second surface 17 among surfaces on the inner side of the casing. Referring to FIG. 1, the first surface 16 is one of the inner surfaces of the casing. The second surface 17 is a surface facing the first surface 16 among the inner surfaces of the casing.

The piezoelectric element 15 is provided between the first cushioning material 13A and the first surface 16, and is capable of expanding and contracting in a direction from the first surface 16 to the optical component 11 (a direction of arrow C in FIG. 1). The piezoelectric element 15 is, for example, a ceramic. The piezoelectric element 15 expands or contracts by applying a voltage to the piezoelectric element 15 by a power supply, which is not illustrated, provided in the casing. Thus, for example, the load applied to the optical component 11 can be increased by expanding the piezoelectric element 15. Furthermore, the load applied to the optical component 11 can be reduced by contracting the piezoelectric element 15.

Figure 3:
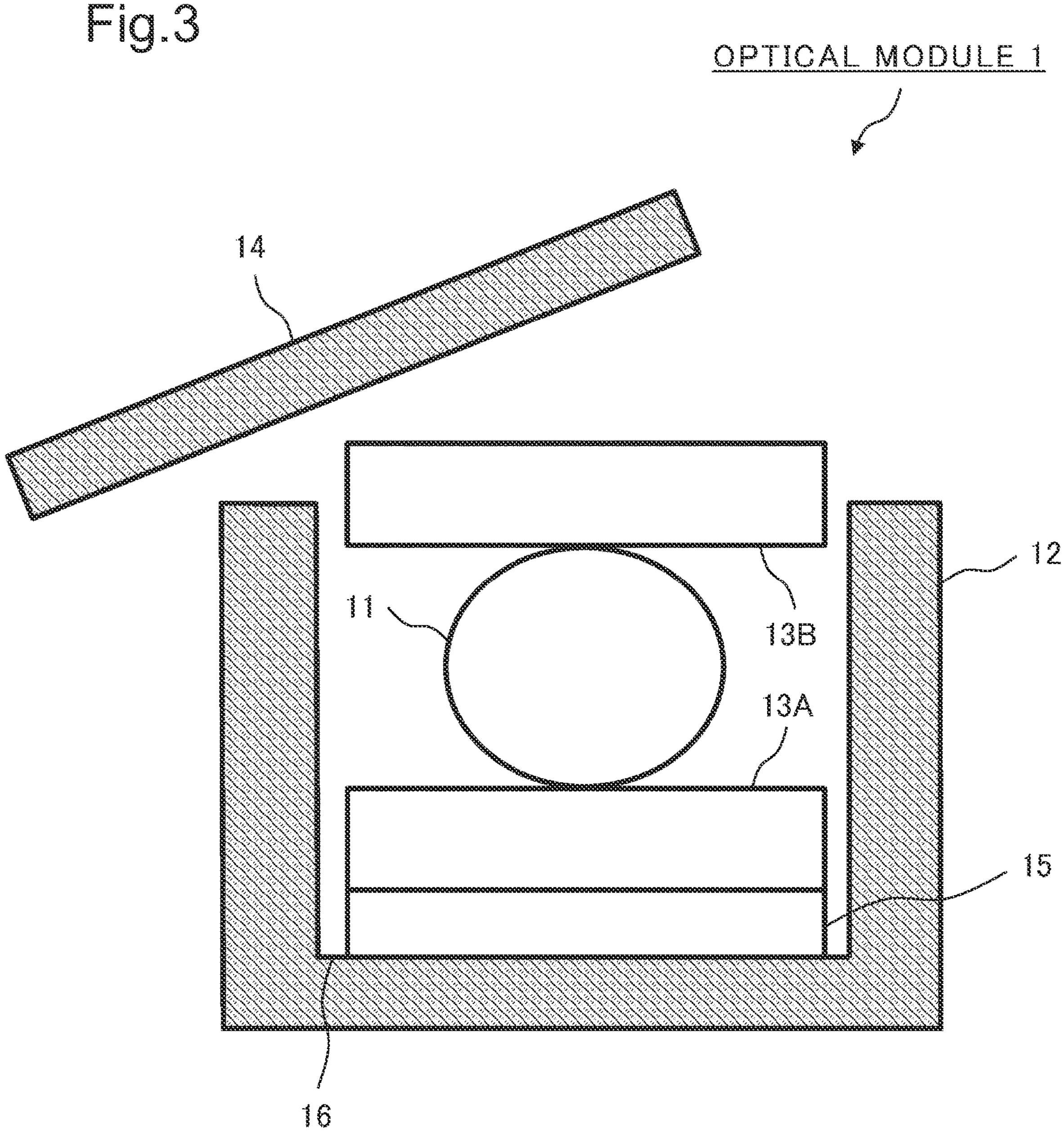
FIG. 3 is a diagram for explaining the optical module according to the first example embodiment of the present invention.

Next, a method of manufacturing the optical module 1 is explained with reference to FIG. 3. As illustrated in FIG. 3, the optical component 11, the first cushioning material 13A, the second cushioning material 13B, and the piezoelectric element 15 are mounted to the substrate portion 12. Furthermore, the lid 14 is attached to the substrate portion 12, thereby sealing the first cushioning material 13A, the second cushioning material 13B, and the piezoelectric element 15 in the casing. Thus, the first cushioning material 13A, the second cushioning material 13B, and the piezoelectric element 15 are sealed in the casing. The first cushioning material 13A and the second cushioning material 13B apply a load to the optical component 11; thus, the optical component 11 is fixed in the casing.

Furthermore, magnitude of the load to be applied to the optical component 11 is adjusted by applying a voltage to the piezoelectric element 15. Specifically, for example, the load to be applied to the optical component 11 is increased by applying a large voltage to the piezoelectric element 15 and expanding the piezoelectric element 15. Alternatively, for example, the load to be applied to the optical component 11 is reduced by applying a small voltage to the piezoelectric element 15 and contracting the piezoelectric element 15.

As described above, the optical module 1 includes the casing associated to a combination of the substrate portion 12 and the lid 14, the first cushioning material 13A, and the piezoelectric element 15. The casing houses the optical component 11. The first cushioning material 13A is provided between the optical component 11 and the first surface 16 on the inner side of the casing. The piezoelectric element 15 is provided between the first cushioning material 13A and the first surface 16, and is capable of expanding and contracting in the direction from the first surface 16 to the optical component 11.

In the optical module 1, the load applied to the optical component 11 can be adjusted by expanding or contracting the piezoelectric element 15. Thus, for example, by increasing the load, a risk of shifting the fixed position of the optical component due to vibration and impact in the sea can be suppressed. Furthermore, for example, by reducing the load, a risk of variation of optical characteristics due to distortion of an optical system in the optical component can be suppressed. Thus, in the optical module 1, the load to be applied to the internal optical component is easily adjustable.

The voltage applied to the piezoelectric element 15 may be adjusted based on an optical signal to be output from the optical component 11. Specifically, the voltage applied to the piezoelectric element 15 may be adjusted to expand or contract the piezoelectric element 15 in such a way that the quality (e.g., intensity) of an optical signal to be output from the optical component 11 is not less than a predetermined threshold. Thus, for example, in the optical module 1, it is possible to suppress variation of optical characteristics due to distortion of an optical system in the optical component 11.

The optical module 1 includes the second cushioning material 13B that is provided between the optical component 11 and the second surface 17 that faces the first surface 16 among the inner surfaces of the casing. Due to the second cushioning material 13B, the optical component 11 is not in direct contact with the casing. Therefore, the casing and the optical component 11 come into contact, whereby breakage of the optical component 11 can be suppressed.

Figure 4:
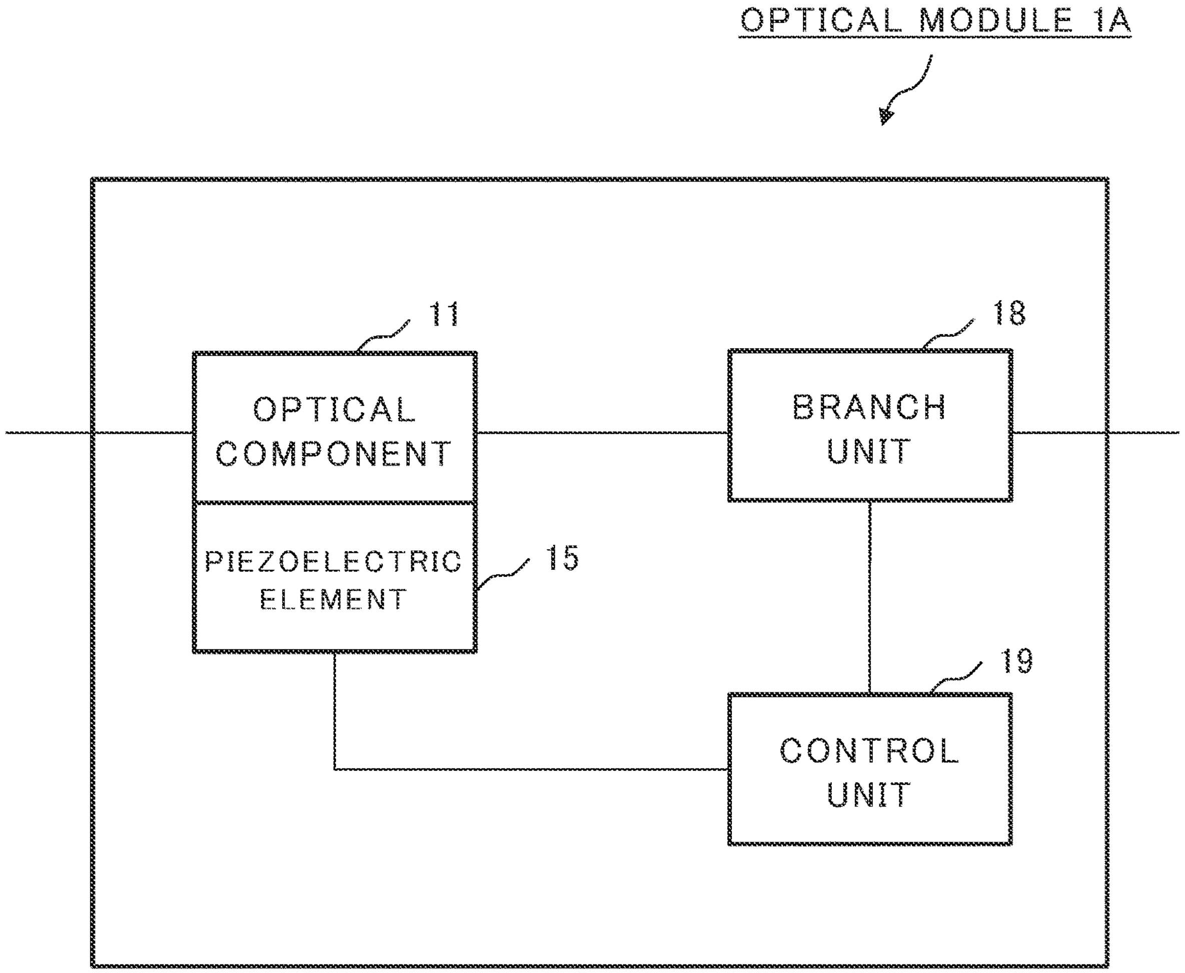
FIG. 4 is a block diagram illustrating a configuration example of an optical module according to a modified example of the first example embodiment of the present invention.

Next, an optical module 1A is explained with reference to FIG. 4. FIG. 4 is a block diagram illustrating a configuration example of the optical module 1A. As illustrated in FIG. 4, the optical module 1A includes the optical component 11, the piezoelectric element 15, a branch unit 18, and a control unit 19. Although not illustrated in FIG. 4, the optical module 1A includes the substrate portion 12, the first cushioning material 13A, the second cushioning material 13B, and the lid 14, similarly to the optical module 1 illustrated in FIG. 1.

The optical component 11 processes light being input from the outside of the optical module 1A through the optical fiber. For example, when the optical component 11 is an isolator, the processing here refers to transmitting an optical signal through the optical component 11. The optical component 11 outputs the processed optical signal to the outside of the optical module 1A. The branch unit 18 branches an optical signal from the optical component 11, and outputs the optical signal to the outside of the optical module 1A and to the control unit 19. The branch unit 18 is, for example, an optical coupler.

The control unit 19 receives, from the branch unit 18, an optical signal being output from the optical component 11. The control unit 19 adjusts, based on the optical signal being output from the optical component 11, the voltage to be applied to the piezoelectric element. For example, the control unit 19 adjusts the voltage to be applied to the piezoelectric element 15 in such a way that deterioration of a characteristic (e.g., intensity) of the optical signal does not exceed a threshold, while monitoring the characteristic of the optical signal. Thus, for example, the optical module 1A can reduce the load applied to the optical component 11 when variation of optical characteristics occurs due to distortion of an optical system in the optical component 11.

Second Example Embodiment

Figure 5:
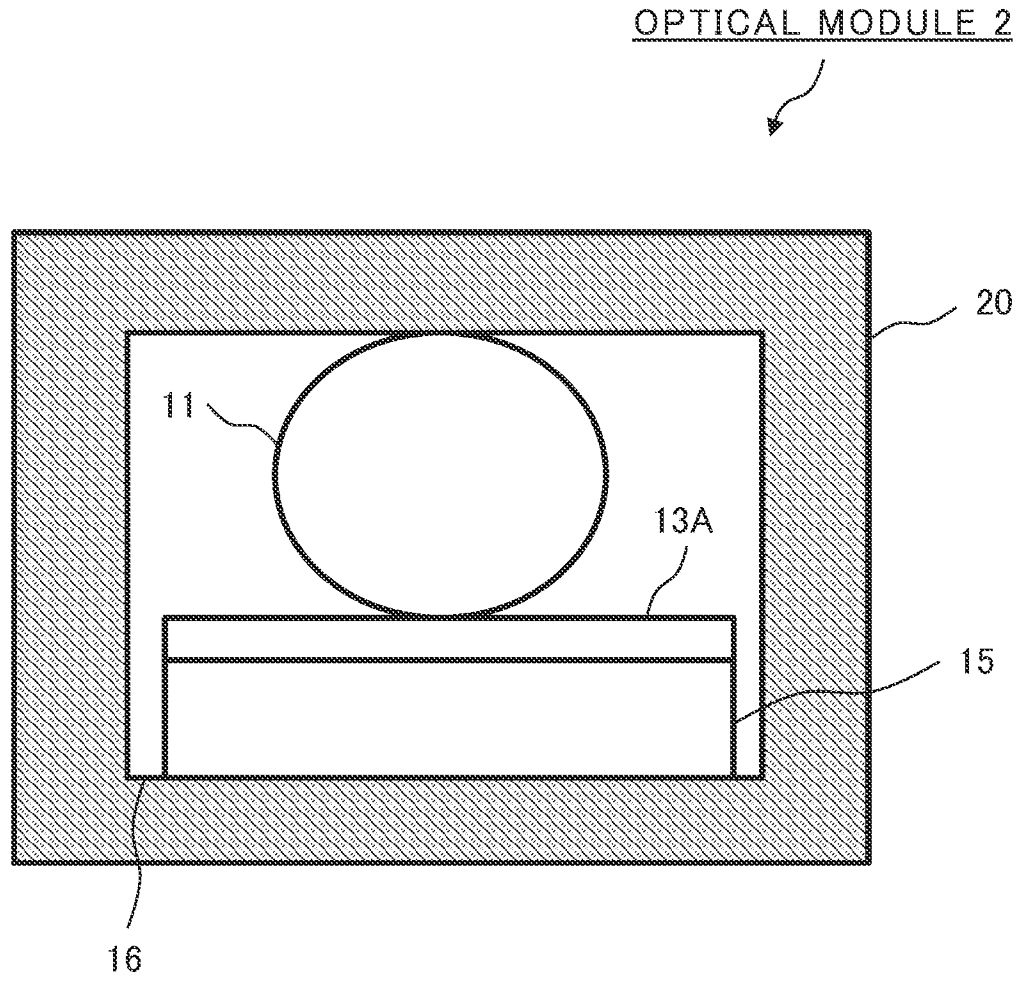
FIG. 5 is a block diagram illustrating a configuration example of an optical module according to a second example embodiment of the present invention.
Figure 6:
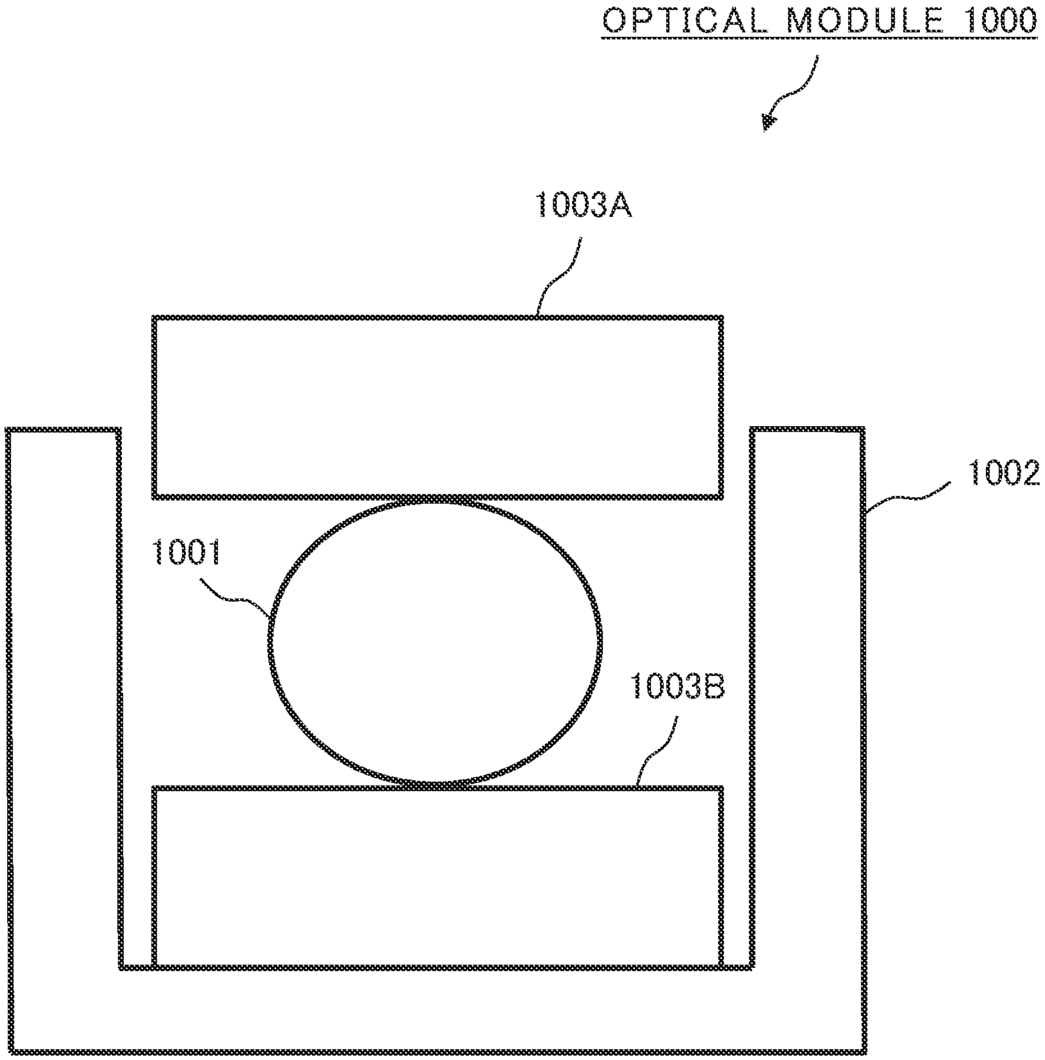
FIG. 6 is a diagram for explaining a related technique.
Figure 7:
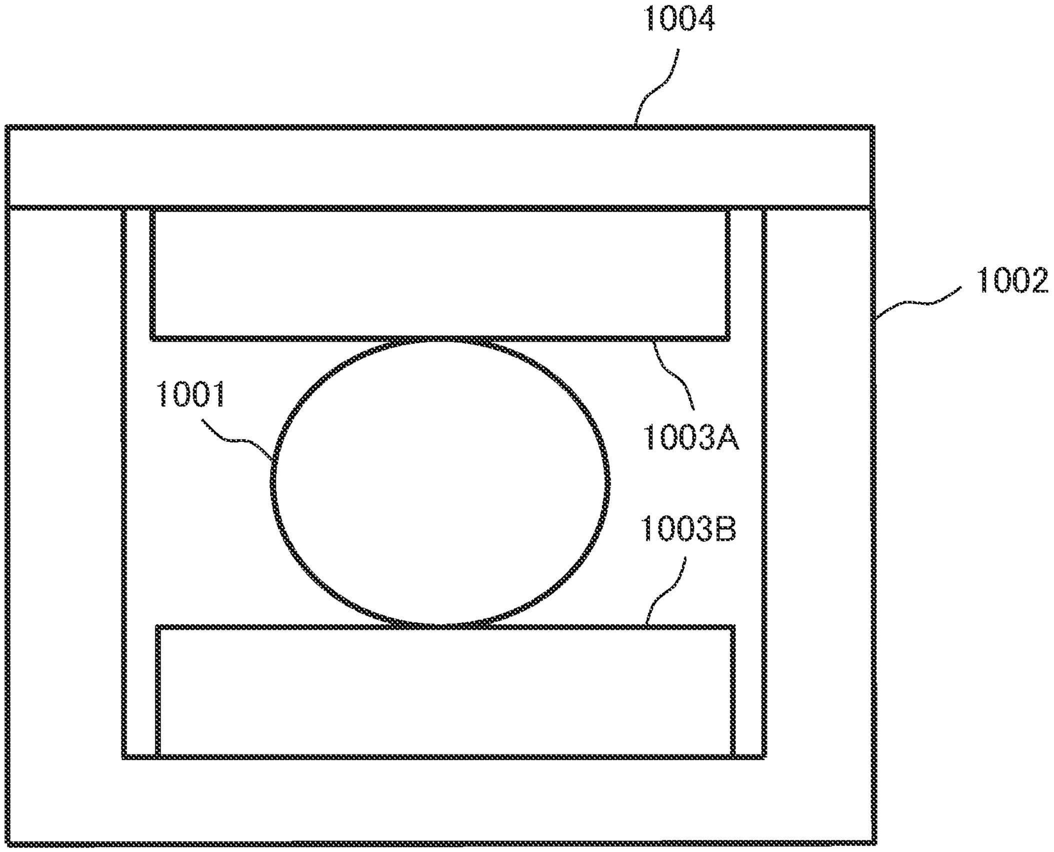
FIG. 7 is a diagram for explaining the related technique.

An optical module 2 according to a second example embodiment is explained based on FIG. 5. FIG. 5 is a schematic diagram illustrating a configuration example of the optical module 2. The optical module 2 includes an optical component 11, a casing 20, a first cushioning material 13A, and a piezoelectric element 15.

The casing 20 houses the optical component 11. The first cushioning material 13A is provided between the optical component 11 and a first surface 16 on an inner side of the casing 20. The piezoelectric element 15 is provided between the first cushioning material 13A and the first surface 16, and is capable of expanding and contracting in a direction from the first surface 16 to the optical component 11.

As described above, in the optical module 2, a load to be applied to the optical component 11 can be adjusted by expanding or contracting the piezoelectric element 15. Thus, for example, by increasing the load, a risk of shifting a fixed position of the optical component due to vibration and impact in the sea can be suppressed. Furthermore, for example, by reducing the load, a risk of variation of optical characteristics due to distortion of an optical system in the optical component can be suppressed. Thus, in the optical module 2, the load to be applied to the internal optical component is easily adjustable.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An optical module comprising:
- an optical component;
- a casing that houses the optical component;
- a first cushioning material provided between the optical component and a first surface of the casing on an inner side of the casing; and
- a piezoelectric element that is provided between the first cushioning material and the first surface and is capable of expanding and contracting in a direction from the first surface toward the optical component, wherein
- a voltage to be applied to the piezoelectric element is adjusted based on an optical signal output from the optical component, and
- the piezoelectric element expands and contracts according to a magnitude of the adjusted voltage.

2. The optical module according to claim 1, further comprising
- a second cushioning material that is provided between the optical component and a second surface facing the first surface among inner surfaces of the casing.

3. The optical module according to claim 1, wherein
- the optical component is an optical isolator, an optical coupler, or an optical filter.

4. The optical module according to claim 1, wherein the optical component is an optical isolator.

5. The optical module according to claim 1, wherein the optical component is an optical coupler.

6. The optical module according to claim 1, wherein the optical component is an optical filter.

7. The optical module according to claim 1, wherein the piezoelectric element is a ceramic.

8. The optical module according to claim 1, wherein the casing further houses the first cushioning material.

9. The optical module according to claim 1, wherein the casing further houses the piezoelectric element.

10. The optical module according to claim 1, wherein the casing further houses the first cushioning material and the piezoelectric element.

11. The optical module according to claim 2, wherein the casing further houses the first cushioning material and the second cushioning material.

12. The optical module according to claim 2, wherein the casing further houses the first cushioning material, the second cushioning material, and the piezoelectric material.

13. The optical module according to claim 1, further comprising a lid attached to the casing.

14. The optical module according to claim 1, further comprising a control circuit configured to receive the optical signal output from the optical component and adjust the voltage applied to the piezoelectric element, wherein
- in response to an optical characteristic of the optical signal varying greater than a threshold, the control circuit reduces the voltage applied to the piezoelectric element.

* * * * *